Dec. 8, 1959     J. S. HANSON ET AL     2,915,776
ADJUSTABLE SPRING-LOADED CASTER
Filed June 5, 1956

INVENTOR.
JAMES S. HANSON
BY ALEXANDER L. NAYLOR

ATTORNEY

United States Patent Office 2,915,776
Patented Dec. 8, 1959

2,915,776

ADJUSTABLE SPRING-LOADED CASTER

James S. Hanson, Norwalk, Conn., and Alexander L. Naylor, Pelham, N.Y., assignors to The Fairbanks Company, New York, N.Y., a corporation of New York Application June 5, 1956, Serial No. 589,411

2 Claims. (Cl. 16—44)

This invention relates to improvements in caster assemblies for trailers, platform trucks and similar kinds of roller-type materials handling equipment, and has particular relation to a spring-loaded, shock-absorbing caster.

The present invention contemplates the provision of a spring-tensioned caster for providing shock-absorbing action, in which the tension of the spring is adjustable to accommodate loads of widely varying weights.

In the use of trailers, platform trucks, and the like, it is a common expedient to utilize spring-tensioned casters for shock-absorbing purposes. The springs of such casters, however, are made to be operatively effective under loads of limited weight ranges only. That is to say, the springs of one platform truck may be made to sustain a load of five hundred pounds, for example. If a load of one hundred pounds is then placed on the truck, the caster springs will not be flexed or compressed, so that they will be ineffective to act as shock absorbers. On the other hand, if a load of one thousand pounds is placed on the truck, the spring will be fully compressed and the result would be the same as if no springs were provided and the caster wheels were rigidly mounted.

Thus it is the present practice to provide shock-absorbing dolly assemblies with various spring tensions to be used selectively on a truck for various load weights within limited ranges. The necessity of having a number of different sets of casters for a single truck entails considerable cost and much inconvenience.

An object of the present invention is to provide spring tensioned casters in which the tension of the springs is readily adjustable so that the springs may act as shock absorbers for loads of widely varying weights.

Another object of the invention is the provision of casters of the type described in which the springs may be adjusted to compensate for unbalanced loads on the truck.

Other objects and advantages of the invention will become apparent during the course of the following specification when taken in connection with the accompanying drawings, in which.

Figures 1, 2:
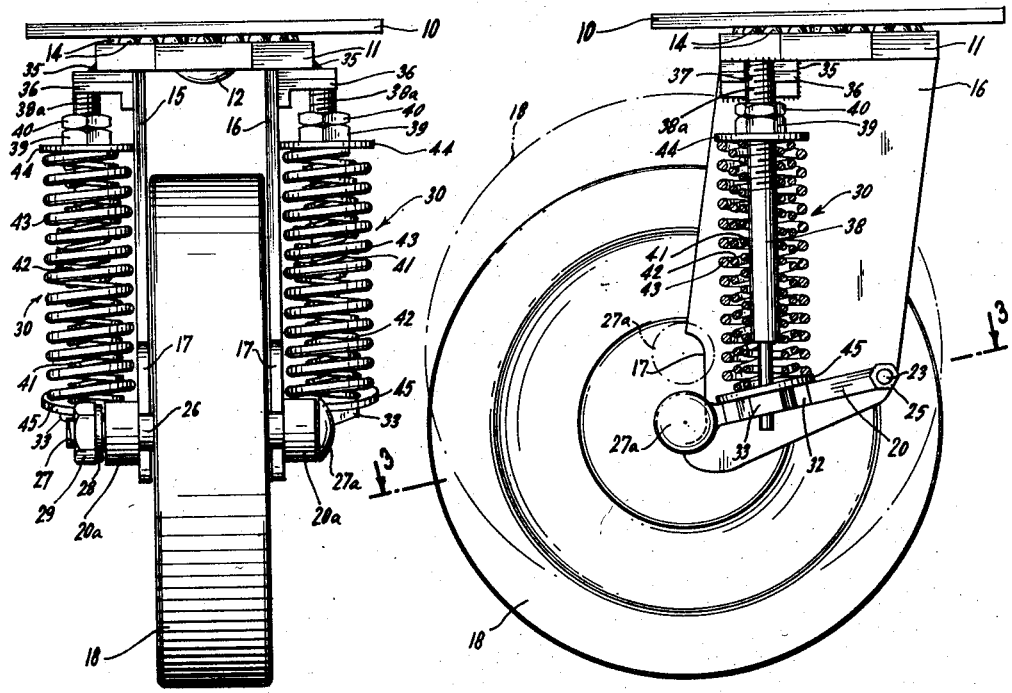
Fig. 1 is a side elevation of a caster and its spring assembly made according to the invention, the caster wheel being shown in full line in its lowermost position, and in phantom in its uppermost position.
Fig. 2 is a front elevational view of the caster and its spring assembly.
Figure 3:
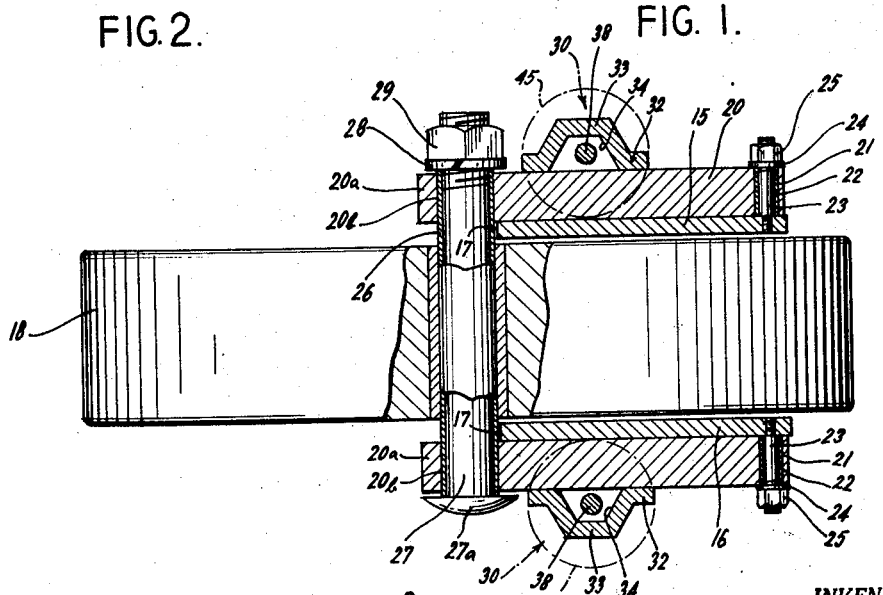
Fig. 3 is a section taken along line 3—3 of Fig. 1.

The caster shown in the drawings comprises a body portion fixed to the bottom surface of a trailer, platform truck or the like, a wheel assembly movably mounted thereon, and spring shock-absorbing means for cushioning the movement of the wheel assembly.

The caster body includes a top plate 10 which is adapted to be secured flush against the under surface of a trailer, platform truck or the like, so that in use of the truck, the plate 10 will be disposed horizontally. The top plate 10 also constitutes part of a swivel top for the caster, being rotatably connected to an octagonal bottom plate 11 by a rivet 12. The plates 10 and 11 contain aligned grooved ball races (not shown) in which ball bearings 14 are contained.

A pair of spaced parallel plates 15 and 16, of similar size and shape, are fixed to the bottom surface of plate 11 and depend perpendicularly and vertically therefrom as shown in Fig. 1. The rear vertical edge of each plate 15 and 16 contains at its lower end a cut-away slot 17.

The caster wheel 18 is mounted between the vertical plates 15 and 16 by a pivoted mounting means in such manner that the wheel is permitted substantially vertical movement relative to the caster body. This vertical movement is limited by the length of the slots 17, as will be presently described, and is cushioned by the spring assemblies.

The wheel 18 is mounted on the plates 15 and 16 by a pair of lever arms 20. Since these lever arms 20 are of identical construction, the lever arm connected to the vertical plate 16, and shown in detail in Fig. 1, will be described, it being understood that this description applies equally to the lever arm 20 connected to plate 15.

Lever arm 20 has a bore 21 at one end thereof, in which a sleeve or bushing 22 is contained. A bolt 23 is threaded into the lower front end of the plate 16, and extends through the sleeve 22 of lever arm 20. A washer 24 is pressed against the end of sleeve 22 by a nut 25 turnably mounted on the outer threaded end of bolt 23. The bolt 23 serves as a pivotal axis about which the end of lever arm 20 may turn.

The other end of lever arm 20 has an enlarged circular portion 20a which carries the axle of wheel 18. The wheel axle is in the form of a cylindrical metal sleeve 26 through which a bolt 27 extends. A washer 28 and nut 29 on the threaded end of bolt 27 cooperate with the head 27a of said bolt to secure bolt 27 within sleeve 26. The sleeve 26 extends through aligned holes 20b in the two enlarged lever arm portions 20a. Since the length of sleeve 26 is greater than the distance between the outer surfaces of lever arms 20, the ends of said sleeve maintain the bolt head 27a and washer 28 slightly spaced from the sides of lever arms 20, thus permitting free rotation of wheel 18.

It will be observed that the sleeve 26 of the wheel axle extends within the slots 17 of the plates 14 and 15, the top and bottom edges of the slots acting as stops to limit vertical movement of the sleeve 26 as the lever arms 20 pivot on their axes 23.

Pivoting movement of the lever arms 20 is cushioned by spring assemblies 30, which are mounted above said respective lever arms. Again, since the spring assemblies 30 are identical in construction, only one assembly 30 will be described in detail, the description applying equally to both.

Each lever arm 20 has a bracket 32 fixed to the outer edge thereof intermediate its ends. Each bracket 32 has an offset central portion 33 spaced from the wall of its respective lever arm and forming an enclosed opening 34. The brackets 32 serve as lower mounts for the respective spring assemblies 30.

Fixed to the bottom surface of plate 11 and to the outer surfaces of plates 15 and 16, as by welding 35, are a pair of L-shaped blocks 36. The horizontal legs of the blocks 36 project beyond the sides of the plate 11 and contain respective terminal grooves 37, as shown in Fig. 1. The top end of a vertically-disposed rod 38 is contained in each groove 37 and is secured therein as by welding.

The lower portion 38b of rod 38 is of reduced diameter and extends freely through the enclosed opening 34 of the bracket 32, permitting free pivoting movement of the lever arms 20.

The upper portion 38a of the rod 38 is threaded to enable an adjusting nut 39 and a lock nut 40 to be turned thereon for adjusting the tension of the springs. Said springs 41, 42, and 43 are of different diameters and are mounted concentrically about the rod 38 in nested relationship within one another. To prevent the turns of one spring from catching within the turns of an adjacent spring, the adjacent springs are wound or coiled in opposite directions, that is to say, the inner spring 41 and outer spring 43 are wound in clockwise directions, while the intermediate spring 42 is wound in a counter-clockwise direction. The three springs cooperate in applying their tensions simultaneously, so that their tensional forces are additive, while their nested relationship provides an external diameter of minimum size.

The opposite ends of springs 41, 42 and 43 rest on a pair of large washers 44 and 45 which are movably mounted on rod 38. The lower washer 45 is seated upon the bracket 32 of lever arm 20, being held in this seated position by the lower portion 38b of rod 38 which extends slidably through said washer 45.

It will be observed that when the wheel 18 is lowered or raised in use, relative to the plates 15, 16, between the limits defined by the slot 17, the springs 41, 42 and 43 will be respectively expanded or compressed between washers 44 and 45.

In operation, the springs of the truck casters may be adjusted to accommodate a specific load weight, as for example a load weight of two hundred pounds. Since trucks of this type normally have four casters, one at each corner, this adjustment is accomplished in each caster by turning the two adjusting nuts 39 on the threaded portions 38a of rods 38, which movement of nuts 39 varies the compressions of the two spring assemblies between the respective pairs of washers 44 and 45. The nuts 39 are turned until the compression of said springs is approximately equal to the load weight to be borne by the caster. When the load is placed on the truck, the wheel axle sleeve 26 is located at the center of the slots 17. In this position, the wheel axle may move vertically up or down in slots 17, thereby compressing or extending the springs, and enabling the springs to act as shock absorbers in both an upward and downward movement of wheel 18.

With the springs set to receive a load of two hundred pounds, and assuming that the truck has four casters, the load weight to be carried by each caster is fifty pounds, and by each of the two spring assemblies of the caster, twenty-five pounds. If a weight of four hundred pounds were subsequently placed on the truck, each spring assembly would be bearing a load weight of fifty pounds instead of the twenty-five pound load for which it was adjusted. The springs would therefore be compressed to such a degree that the wheel axle will move to the top of slot 17, this position being shown in phantom in Fig. 1. The entire weight of the loaded truck would then be transmitted through the plates 15 and 16 directly to the axle of wheel 18, so that the springs would be by-passed and would be ineffective as a shock-absorbing cushion between the truck body and the wheels.

The overloaded condition of the springs may be corrected by turning adjusting nuts 39 downwardly on the rod threaded portions 38a, thereby further compressing the spring assemblies until they, in effect, counter balance the load weight, and the spring tension urges the washers 44 upwardly until the wheel axle is again at the center of slot 17.

On the other hand, if the spring assemblies of the casters are set for a load of two hundred pounds and a one hundred pound load is placed on the truck, the springs will remain uncompressed by the load, and the wheel axle will remain at the bottom of slot 17, in the position shown in full line in Fig. 1. To correct this condition, the adjusting nuts 39 are turned upwardly on the rod threaded portions 38a, thereby decreasing the compression of the springs, until the wheel axle is at the center of slot 17.

In actual practice, a load is placed on the truck, and the spring assemblies of each caster individually adjusted by means of the nuts 39 until the wheel axles are all located at the centers of slots 17. The wheels are then supported by the springs 41, 42, and 43 which act to absorb shocks and maintain the truck body level and relatively free from movement as the wheels encounter obstacles, ruts, etc., and they move vertically relative to the caster body.

The caster spring assemblies may also be adjusted to compensate for an uneven load placed on the truck, that is a load which is heavier at one end or one side of the truck. Such a load would normally over-load the springs of some of the casters and not others, causing these springs to be ineffective as shock absorbers and also causing the truck platform to tilt. The casters may thus be adjusted to bring the unevenly loaded truck to a horizontal, level position with all of the spring assemblies operative as shock absorbers.

An important advantage of the invention is that, in use, the caster springs are always under compression, rather than being elongated and tensioned. Thus the springs will remain effective for a much greater period than if they were tensioned.

While a preferred embodiment of the invention has been shown and described herein, it will be obvious that numerous omissions, changes, and additions may be made therein without departing from the spirit and scope of the invention.

What we claim is:

1. A swivel caster for platform trucks or the like, comprising a body portion including a swivel base adapted to be secured to the lower surface of said truck and at least one plate depending from said base, a wheel having an axle, and means for mounting said wheel on said plate for limited vertical movement of said wheel relative to said base, said mounting means including at least one lever arm pivoted at one end to said plate and disposed substantially horizontally, the free end of said lever carrying said wheel axle, a rod rigidly mounted at its top end on said body portion and extending vertically along said plate, the lower end of said rod extending slidably through an intermediate portion of said lever arm, the upper portion of said arm being threaded, a coil spring mounted on said rod and seated upon the intermediate portion of said lever, a nut turnably mounted on the threaded upper portion of said rod in operative engagement with the top of said spring for adjusting the tension of said spring against said lever, said plate having spaced stop means positioned to engage said axle to limit the upward and downward pivoting movement of said lever relative to said plate, said nut being adjustable to vary the spring tension for positioning the wheel axle evenly between said stop means regardless of the load weight on said truck.

2. A caster assembly for a platform truck and the like comprising a fixed section adapted to be secured to and depend from said truck, a lever pivoted at one end to said fixed section, a wheel having an axle, said axle being carried by the other end of said pivoted lever, a rod rigidly mounted at its top end on said fixed section and depending therealong, said rod having a threaded upper end, the lower end of said rod extending downwardly and passing slidably through an intermediate portion of said pivoted lever, a nut assembly threadedly mounted on the threaded upper end of such rod for adjustable movement relative to said rod toward and away from said pivoted lever, at least one coil spring coiled about said rod and seated upon an intermediate portion of said lever, said nut being turnable for adjusting the tension of said spring against said lever, and stop means on said fixed section positioned to engage said axle to limit upward and downward pivoting movement of said lever relative to said fixed section, selective movement of said nut assembly adjustably varying the compression of said coil spring to position said wheel axle evenly between said stop means regardless of the load weight on said truck.

References Cited in the file of this patent

UNITED STATES PATENTS

| | | |
|---|---|---|
| 819,302 | Munsing | May 1, 1906 |
| 1,634,932 | Cook | July 5, 1927 |
| 1,791,896 | Henning | Feb. 10, 1931 |
| 1,958,905 | Anderson | May 15, 1934 |
| 2,447,582 | Klumb | Aug. 24, 1948 |
| 2,507,980 | Knapp | May 16, 1950 |
| 2,577,244 | Hedgpeth | Dec. 4, 1951 |
| 2,637,569 | Turner | May 5, 1953 |

FOREIGN PATENTS

| | | |
|---|---|---|
| 437,356 | Great Britain | July 27, 1934 |
| 490,858 | Germany | Feb. 1, 1930 |
| 1,112,584 | France | Nov. 16, 1955 |